(12) United States Patent
Dufty

(10) Patent No.: US 7,438,516 B2
(45) Date of Patent: Oct. 21, 2008

(54) TRAILER

(75) Inventor: Raymond J. Dufty, Ernest (AU)

(73) Assignee: Forestfield Pty Ltd, Mermaid Beach, Queensland (AU)

( * ) Notice: Subject to any disclaimer, the term of this patent is extended or adjusted under 35 U.S.C. 154(b) by 312 days.

(21) Appl. No.: 10/503,850

(22) PCT Filed: Feb. 6, 2003

(86) PCT No.: PCT/AU03/00121

§ 371 (c)(1),
(2), (4) Date: Dec. 1, 2004

(87) PCT Pub. No.: WO03/066373

PCT Pub. Date: Aug. 14, 2003

(65) Prior Publication Data

US 2005/0073133 A1 Apr. 7, 2005

(30) Foreign Application Priority Data

Feb. 6, 2002 (AU) .................................. PS0347

(51) Int. Cl.
*B60P 1/04* (2006.01)
(52) U.S. Cl. .................. 414/483; 414/482; 414/485
(58) Field of Classification Search ............. 414/471, 414/482, 483, 485, 480, 484, 556, 557; 280/408
See application file for complete search history.

(56) References Cited

U.S. PATENT DOCUMENTS

| | | | | | |
|---|---|---|---|---|---|
| 2,219,585 | A | * | 10/1940 | Begin | 298/2 |
| 2,418,567 | A | * | 4/1947 | Ausherman | 414/480 |
| 2,795,345 | A | * | 6/1957 | Crandall | 414/483 |
| 3,342,508 | A | * | 9/1967 | Thomas | 280/414.1 |
| 3,764,031 | A | * | 10/1973 | Parsen | 414/485 |
| 3,768,671 | A | * | 10/1973 | LaVier | 414/556 |
| 3,963,137 | A | * | 6/1976 | Chayer | 414/483 |
| 3,979,137 | A | | 9/1976 | Lipscomb, Jr. et al. | |
| 4,051,967 | A | | 10/1977 | Sedgwick et al. | |
| 4,058,229 | A | * | 11/1977 | Triplett | 414/546 |
| 4,685,855 | A | * | 8/1987 | Celli | 414/482 |
| 4,813,841 | A | | 3/1989 | Eischen | |
| 4,826,385 | A | * | 5/1989 | Martinsen | 414/373 |
| 4,944,648 | A | * | 7/1990 | Parr | 414/483 |
| 5,030,053 | A | * | 7/1991 | Wickizer | 414/24.5 |
| 5,090,718 | A | | 2/1992 | Kauffman | |
| 5,411,284 | A | * | 5/1995 | Harbin | 280/656 |
| 5,540,540 | A | * | 7/1996 | Peterson | 414/563 |
| 5,564,883 | A | | 10/1996 | Swanner | |

(Continued)

FOREIGN PATENT DOCUMENTS

CA  1 196 044  10/1985

(Continued)

*Primary Examiner*—James Keenan
(74) *Attorney, Agent, or Firm*—Hudak, Shunk & Farine Co. LPA

(57) ABSTRACT

A trailer including (i) a trailer frame supported by ground engaging wheels; (ii) an auxiliary drawbar pivotable from a retracted inoperative position to an extended or towing position located behind the trailer frame; and a (iii) main drawbar to a prime mover. There is also provided a pivot frame pivotally attached to the trailer frame by pivot attachment joints which may extend from an extended leading position for maintenance apparatus to a retracted transportation position.

19 Claims, 8 Drawing Sheets

U.S. PATENT DOCUMENTS

| | | | | |
|---|---|---|---|---|
| 5,727,920 A | * | 3/1998 | Hull et al. | 414/476 |
| 6,149,369 A | * | 11/2000 | Reed | 414/480 |
| 6,241,450 B1 | * | 6/2001 | Gehman | 414/480 |
| 6,309,167 B1 | * | 10/2001 | McPherrin | 414/457 |
| 6,447,237 B1 | * | 9/2002 | Haynes | 414/483 |
| 6,450,756 B1 | * | 9/2002 | Stahancyk et al. | 414/426 |
| 6,520,521 B2 | * | 2/2003 | Mayfield | 280/124.106 |
| 6,695,564 B2 | * | 2/2004 | Pfisterer | 414/485 |
| 6,840,543 B2 | * | 1/2005 | Dufty | 280/789 |
| 2002/0109345 A1 | | 8/2002 | Dufty | |

FOREIGN PATENT DOCUMENTS

CA      2 226 280      1/2002

\* cited by examiner

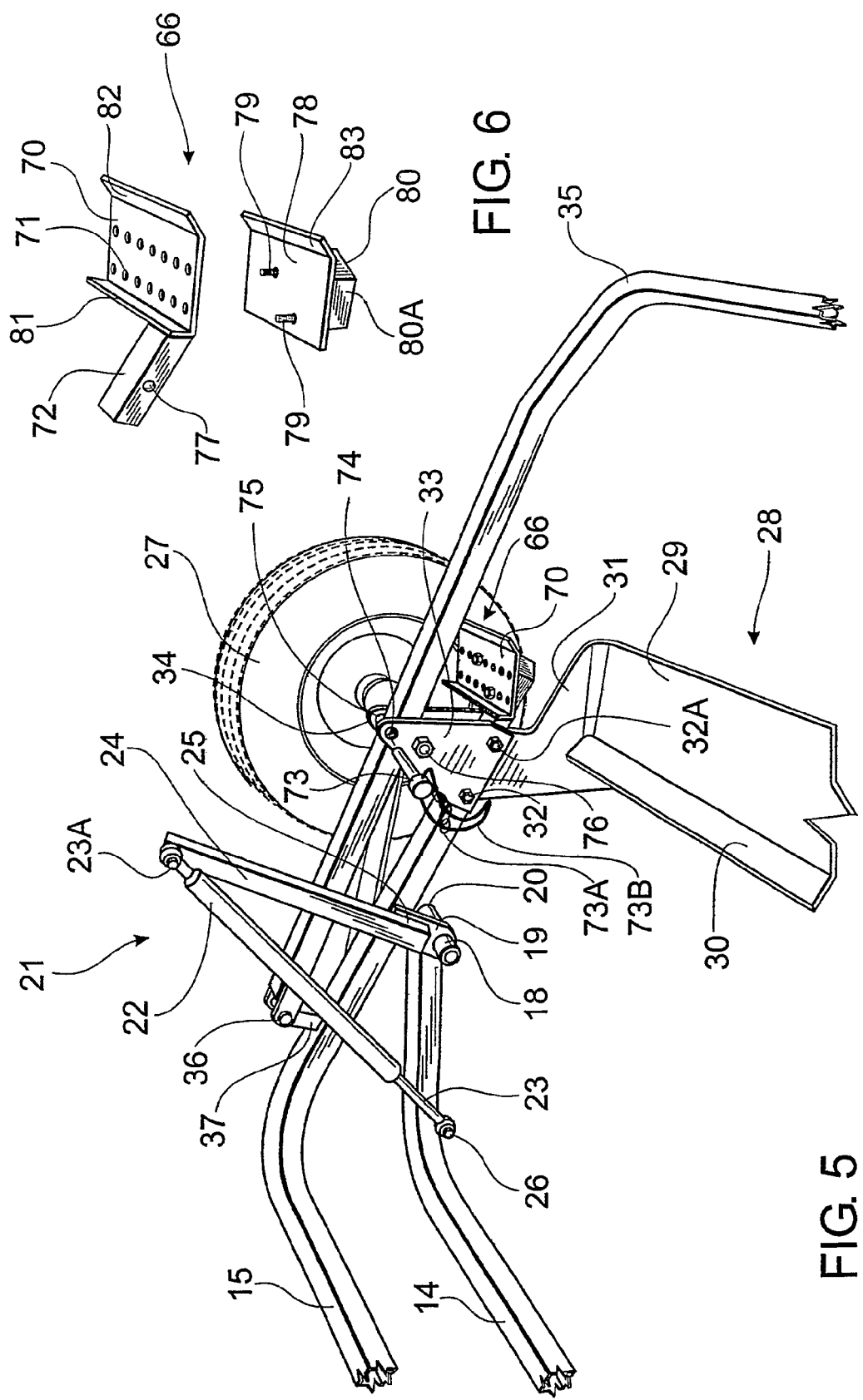

TRAILER

FIELD OF THE INVENTION

THIS INVENTION relates to an improved trailer which is particularly suitable for loading of maintenance machines or apparatus inclusive of turf maintenance machines or apparatus inclusive of mowers, rollers, aerating machines, compacting machines and the like. However, it will be appreciated that the trailer can be used for supporting other loads such as furniture or particulate material, such as sand or cement.

BACKGROUND OF THE INVENTION

It has often been a drawback of a conventional trailer, such as a standard box trailer, attached to a prime mover, such as a utility vehicle or pickup truck, four wheel drive vehicle or normal sedan, that the loads which were intended to be carried by such trailers were limited in scope, particularly in relation to carrying turf maintenance machines as described above. Thus, for example, it was normally only possible to carry a single maintenance machine because of its bulk and relatively heavy weight.

SUMMARY OF THE INVENTION

It is an object of the invention to provide a trailer, which may be used to reduce the abovementioned drawback associated with the prior art.

The trailer of the invention includes:
(i) a trailer frame supported by ground engaging wheels;
(ii) a pivot frame having opposed longitudinal frame members which pivot frame is pivotally attached to the trailer frame by pivot attachment means;
(iii) a support plate extending between the opposed longitudinal frame members of the pivot frame and oriented transversely thereto and attached thereto at a rear end of the pivot frame; and
(iv) width adjustment means located at each end of the support plate, whereby in use said pivot frame pivots from a retracted position to an operation or extended position to facilitate loading of maintenance apparatus or other apparatus of varying widths onto the support plate and subsequent lifting of the maintenance apparatus or other apparatus clear of the ground when the pivot frame is pivoted to the retracted position.

The trailer of the invention may also include connection means to a prime mover.

The prime mover in the context of the present invention not only includes a truck, sedan, pickup vehicle or utility vehicle which functions as a conventional prime mover, but also another trailer of the invention.

The trailer of the invention may also include an auxiliary drawbar pivotable from a retracted inoperative position to an extended or towing position located behind the trailer frame.

The pivot frame preferably is U shaped, although this is not necessary and the frame may adopt other shapes such as being H shaped or V shaped or even being rectangular or triangular. However, a U shape is preferable for convenience. It is however preferred that the pivot frame has at least a U shaped rear end.

The trailer frame may have the same configuration as the pivot frame and, thus, may have a number of shapes as described for the pivot frame. Preferably, however, the trailer frame has a U shaped end having opposed frame members meeting at a common vertex with a main drawbar.

The auxiliary drawbar is preferably pivotally attached to the pivot frame by pivot attachment means as described hereinafter. The auxiliary drawbar is U shaped, although it may adopt other shapes, such as a rectangular shape or triangular shape. However, a U shape is preferable.

In the retracted position, the auxiliary drawbar may overlie the pivot frame and be in abutment with the pivot frame. However, in the operative or extended position, the auxiliary drawbar may extend outwardly from a rear end of the trailer frame.

The auxiliary drawbar may also be provided with a hitch coupling having opposed apertures so as to retain an associated hitch pin so as to pull an adjacent trailer on the invention. Alternatively, the hitch coupling may comprise a ball joint mounted in a supporting socket of complementary shape.

The pivotal attachment means, between the trailer frame and the pivot frame, may comprise a single pivot joint or, more preferably, a pair of pivot joints, which are suitably in opposed relationship. Such pivot joints may comprise hinge joints, pivot sleeves, or adopt a pivot pin interconnecting two frame members. Most preferably, use is made of a pivot sleeve using one bush or a pair of bushes as is considered appropriate.

A similar type of pivot attachment means may be used to interconnect the auxiliary drawbar and the pivot frame.

The connection means between the trailer and the prime mover may be provided by the aforesaid main drawbar interconnecting the trailer frame and the prime mover. The main drawbar may be integral with, or rigidly attached to, the trailer frame.

Maintenance apparatus to which the trailer of the invention is associated may comprise any apparatus suitable for maintenance of grass or turf or for shifting soil such as rotary hoes and the like. Turf maintenance apparatus, such as lawn mowers, lawn rollers, turf aerators or compactors, may be used as discussed above.

The pivot frame may be attached to the maintenance apparatus in any suitable manner. Preferably, in a transportation mode, the pivot frame will normally overlie the trailer frame and be in abutment with the trailer frame. However, in a loading mode, the pivot frame may be pivoted upwardly, relative to the stationary trailer frame to facilitate attachment to the maintenance apparatus.

Preferably the support plate in a loading position lies on the ground for loading or movement of the maintenance apparatus onto the support plate. However when the pivot frame is pivoted upwardly to a transportable position the support plate may be elevated clear of the ground to support the maintenance apparatus also clear of the ground.

There also may be provided fluid actuated means which interconnects the pivot frame and the trailer frame, which cushions or inhibits sudden upward pivotal movement of the pivot frame relative to the trailer frame and which also assists in gentle lowering of the maintenance apparatus for unloading purposes, when required. Thus, the provision of the fluid actuated means is a safety feature and, thus, may comprise a hydraulic ram assembly or a pneumatic ram assembly, such as a gas strut.

BRIEF DESCRIPTION OF THE DRAWINGS

Reference is made to a preferred embodiment of the invention shown in the accompanying drawings wherein:

FIG. 5 is a perspective view of part of the trailer of FIG. 1 showing the support plate and the adjustment mechanism to accommodate mowers of different axle widths;

FIG. 6 is an exploded view of the adjustment mechanism shown in FIG. 5;

DETAILED DESCRIPTION OF THE DRAWINGS

Figure 1:
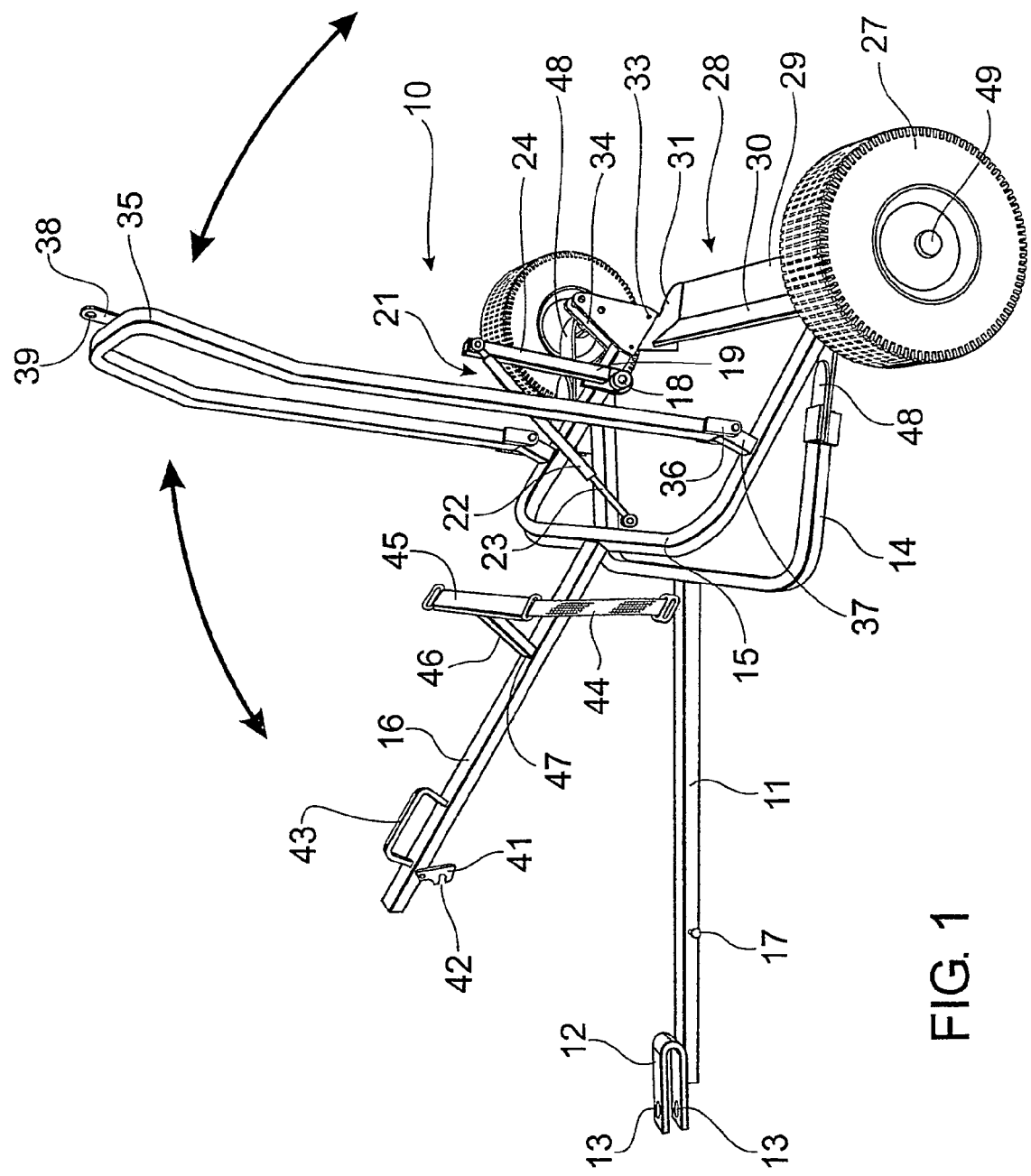
FIG. 1 is a perspective view of the trailer of the invention.

In FIG. 1, there is shown trailer 10 having a main drawbar 11, hitch connection 12 having hitch apertures 13, fixed or trailer frame 14 and pivot frame 15. Pivot frame 15 has connection arm 16 for attachment to drawbar 11 at projection 17. Pivot frame 15 is pivotally attached to trailer frame 14 by opposed pivot joints 18, which each extend through an associated support bracket 19. Each bracket 19 is fixed or welded to pivot frame 15 at 20 as best shown in FIG. 5.

Figure 4:
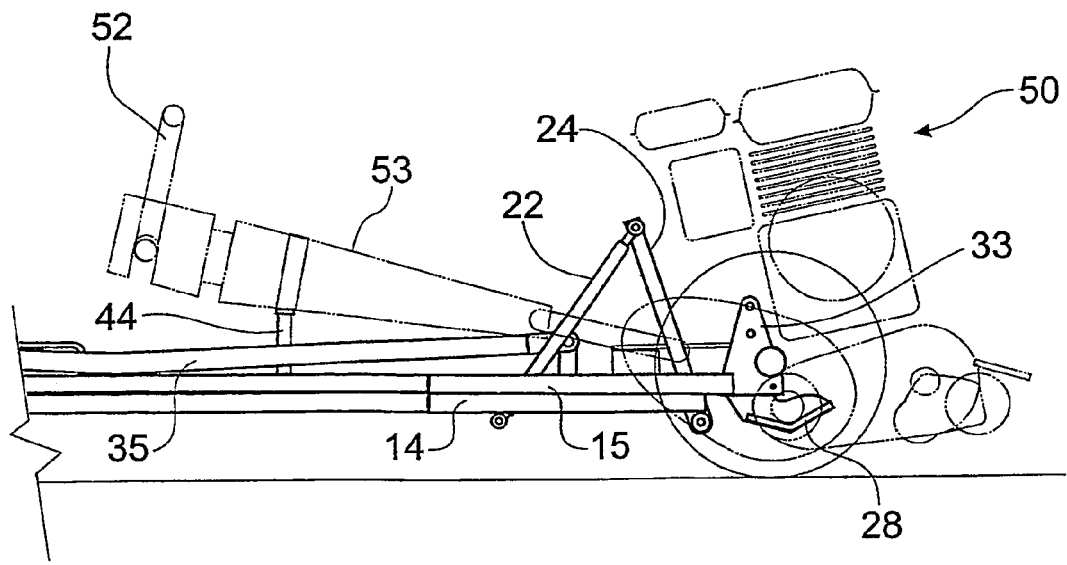
FIG. 4 is a similar view to that shown in FIG. 3 showing the mower loaded onto the trailer.

In the transportation position, best shown in FIG. 4, pivot frame 15 lies adjacent to or abutting trailer frame 14. There is also provided a hydraulic ram assembly 21 having cylinder 22 and piston 23 shown in FIG. 5, wherein cylinder 22 is pivotally attached at 23A to support rod 24, which is welded or otherwise rigidly attached to support bracket 19 at 25 best shown in FIG. 5. Piston 23 is pivotally attached to trailer frame 14 at 26.

Trailer frame 14 is provided with ground engaging wheels 27. At the rear or free end of pivot frame 15 is support tray or plate 28 which includes a planar ledge 29 and abutment rib 30. Support tray 28 has opposed and upstanding attachment lugs 31 which are fixedly attached to opposed brackets 33 and 34 by fasteners 32. Fasteners 32 also extend through aligned apertures (not shown) in pivot frame 15. Thus upon pivotal movement of pivot frame 15 there is provided corresponding pivotal movement of support tray 28. There is also provided an auxiliary pivot drawbar 35 which is pivotally attached to pivot frame 15 by pivot joints 36 attached to support brackets 37 best shown in FIG. 5. Auxiliary drawbar 35, as shown by the arrows in full outline in FIG. 1, may pivot independently of pivot frame 15 from retracted or inoperative position shown in FIG. 2 abutting pivot frame 15 in phantom to a towing position shown in full outline. Auxiliary drawbar 35 is also provided with towing lug 38 having hitch aperture 39 best shown in FIG. 1.

Connection arm 16 has securing plate 41 and notch 42 which engages with projection 17 when in the retracted position shown in FIG. 4. Connection arm 16 is also provided with handle 43. Connection arm 16 is also provided with securing strap 44, which extends through support sleeve 45 attached to support arm 46 welded to connection arm 16 at 47. There is also provided leaf spring 48 for resiliently supporting stub axles 49 of each wheel 27.

Figure 2:
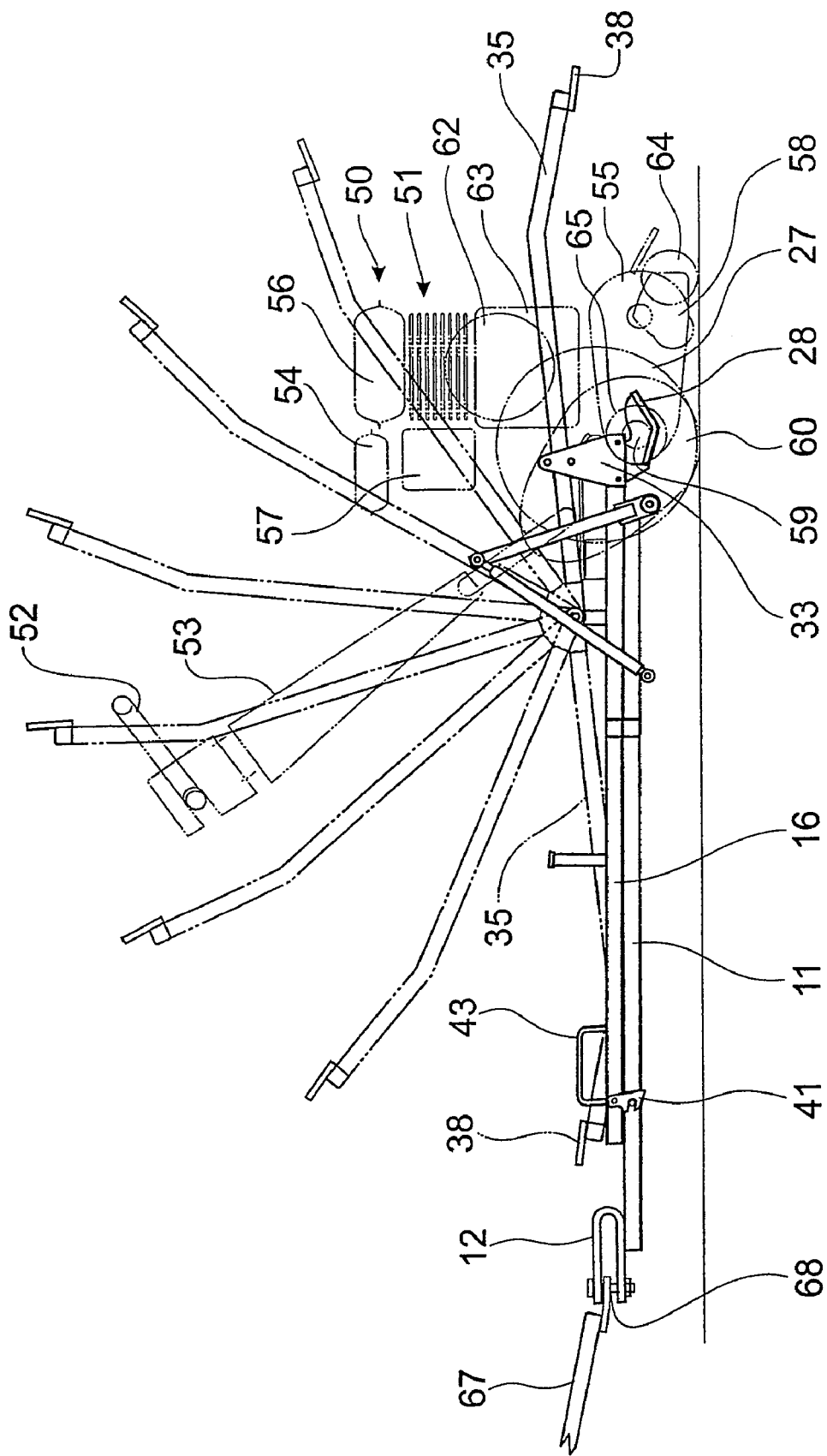
FIG. 2 is a side view of the trailer of FIG. 1 showing varying pivot positions of the auxiliary drawbar.

In FIG. 2 there is shown trailer 10 in a loading position so as to load lawn mower 50 onto trailer 10. In this position, chassis 51 of mower 50 is supported by support tray 28 with handle support arm 53 orientated as shown. The mower 50 has handle 52, filter 54, cutting head 55, fuel tank 56, carburettor 57, cutting mechanism 58, axle ends 59 extending through an associated drive housing 60, gearbox 62, engine 63, mower support wheels 64 and bearings 65.

Reference should be made to FIG. 5, which shows the detail of axle support mechanism 66 for supporting axle ends 59.

In FIG. 2, there is also shown the full movement of auxiliary drawbar 35 from an inoperative or retracted position, shown in phantom, to an extended or operative position, shown in full outline. The intermediate positions between these two extremes are shown in phantom. It will be appreciated that pivotal movement of auxiliary drawbar 35 is clear of mower 50.

In FIG. 2, there is also shown a hitch coupling 67 connected to a prime mover (not shown), which is attached to hitch connection 12 by hitch pin 68.

Figure 3:
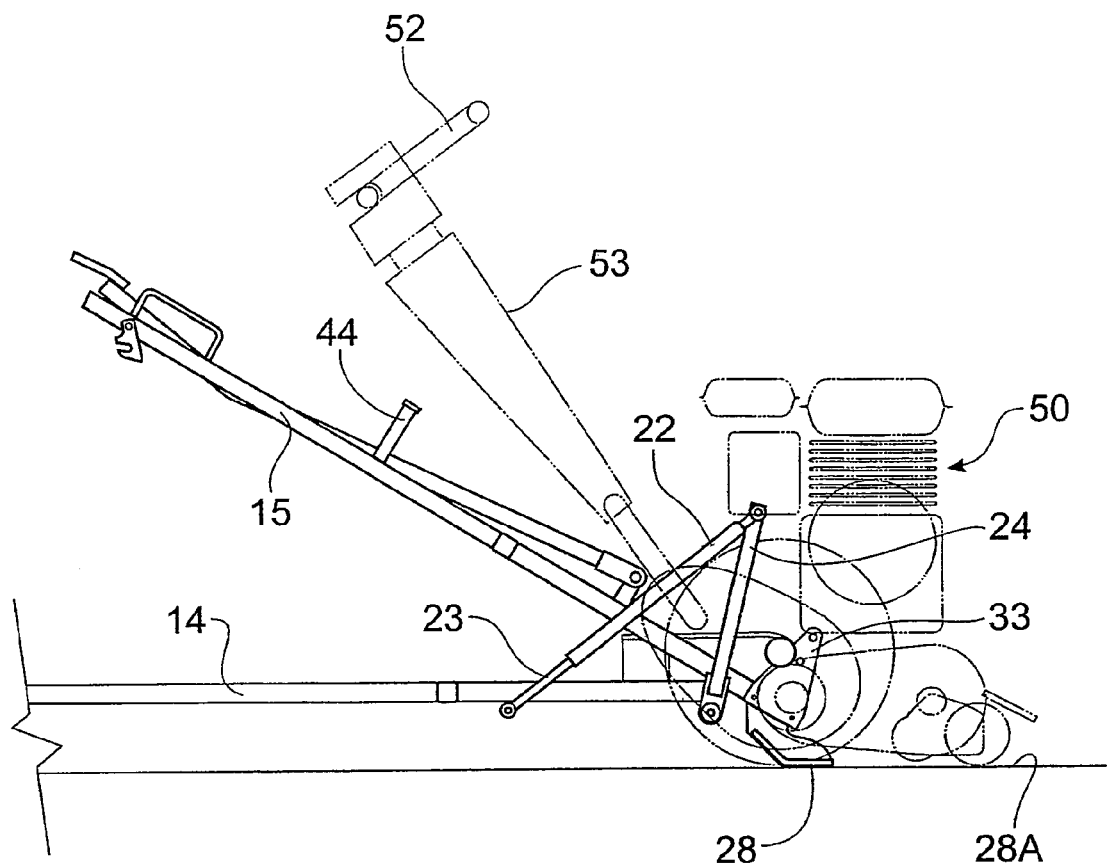
FIG. 3 is a side view of the trailer of FIG. 1 showing the mower about to be loaded onto the trailer.

In FIG. 3, the loading position for mower 50 onto tractor 10 is also shown. There is also shown handle support arm 53 about to be connected to pivot frame 15 by strap 44. Auxiliary drawbar 35 is also shown adjacent pivot frame 15.

In FIG. 4, the mower 50 is shown in a loaded position with handle support arm 53 attached to pivot frame 15 by strap 44. Auxiliary drawbar 35 is also shown in the retracted position.

In FIGS. 3-4, it will be noted that when frame 15 is in the loading position mower 50 can be wheeled onto support plate 28 which rests on the ground 28A as shown in FIG. 3. Upon pivotal movement of frame 15 to the transportation position shown in FIG. 4, support plate 28 will also move simultaneously to the position shown in FIG. 4 to elevate the mower 50 off the ground 28A.

In FIG. 5, there is shown a detailed view of the axle support mechanism 66 for axle ends 59, wherein support plate 70 is provided having a plurality of adjustment apertures 71. Support plate 70 is attached to elongate extension 72, which is telescopically engaged with an adjacent hollow end (not shown) of pivot frame 15 and which is retained between brackets 33 and 34. Fastener 73 is shown, which extends through co-aligned apertures 74 and 75 of brackets 33 and 34 and, thus, may retain auxiliary drawbar 35 in an extended position when required. There is also provided a retaining mechanism for pin 73 comprising chain 73A and ring 73B. There is also provided additional fastener 76, which interconnects brackets 33 and 34 and which supports auxiliary drawbar 35 so that it is spaced from pivot frame 15 as shown in FIG. 5. Fasteners 32 interconnect bracket 33, the hollow ends (not shown) of pivot frame 15 and bracket 34. Fasteners 32A extend through apertures 77 shown in elongate extensions 72 shown in FIG. 6 and the hollow ends (not shown) of pivot frame 15.

Figure 11:
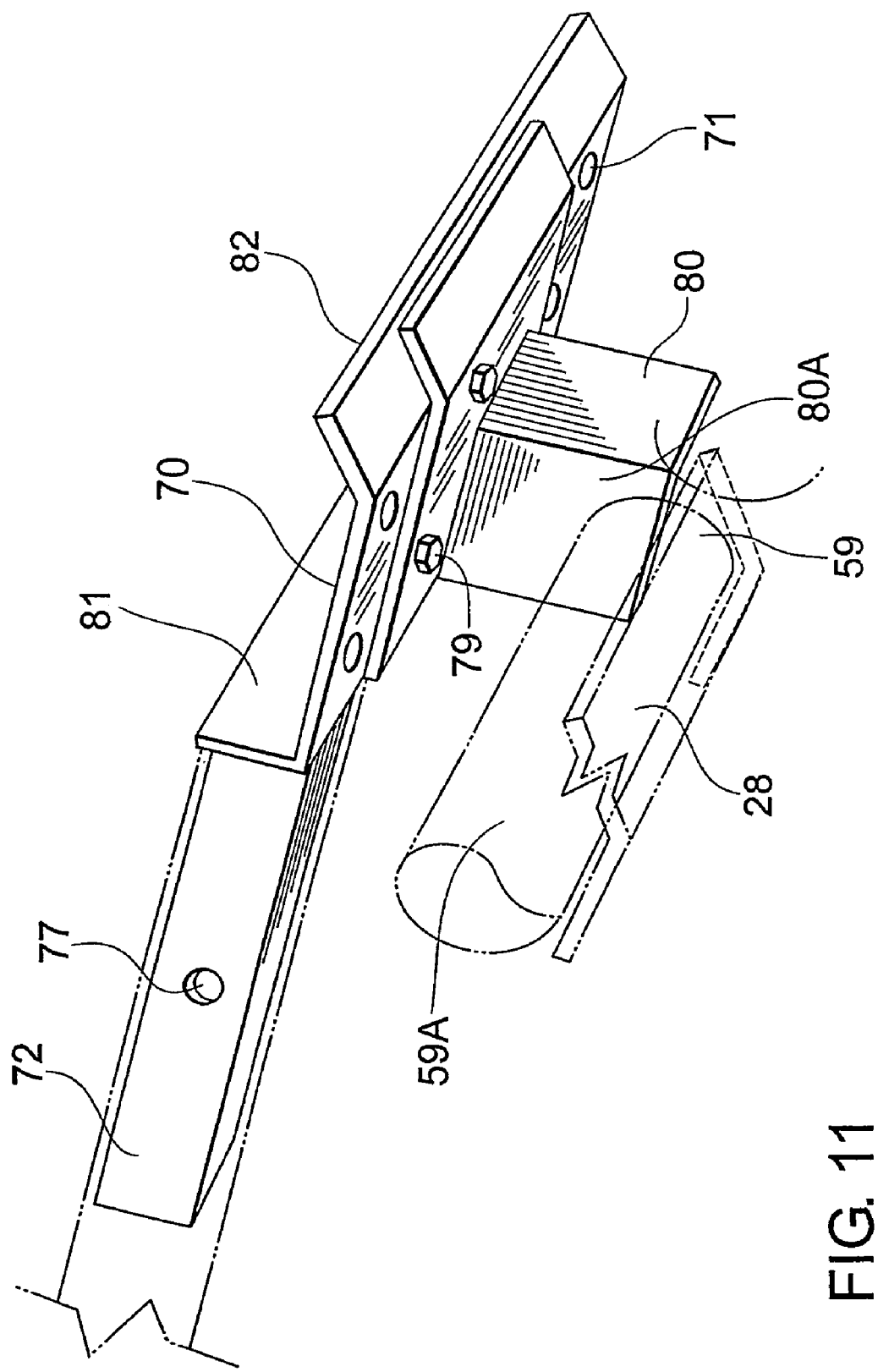
FIG. 11 is a detailed perspective view of the support plate and associated width adjustment mechanism of FIG. 6 supporting an axle of maintenance apparatus.

The adjustment mechanism 66 shown in FIG. 6 comprises the combination of support plate 70 with apertures 71 and bottom plate 78 having upstanding fasteners 79, which may extend through selected adjustment apertures 71. Plate 78 has bearing plate 80 having oblique part 80A which plate 80 abuts an associated axle end 59 as shown in FIG. 11. Plate 70 is provided with peripheral flanges 81 and 82 and flange 82 abuts mating flange 83 of bottom plate 78.

Figure 7:
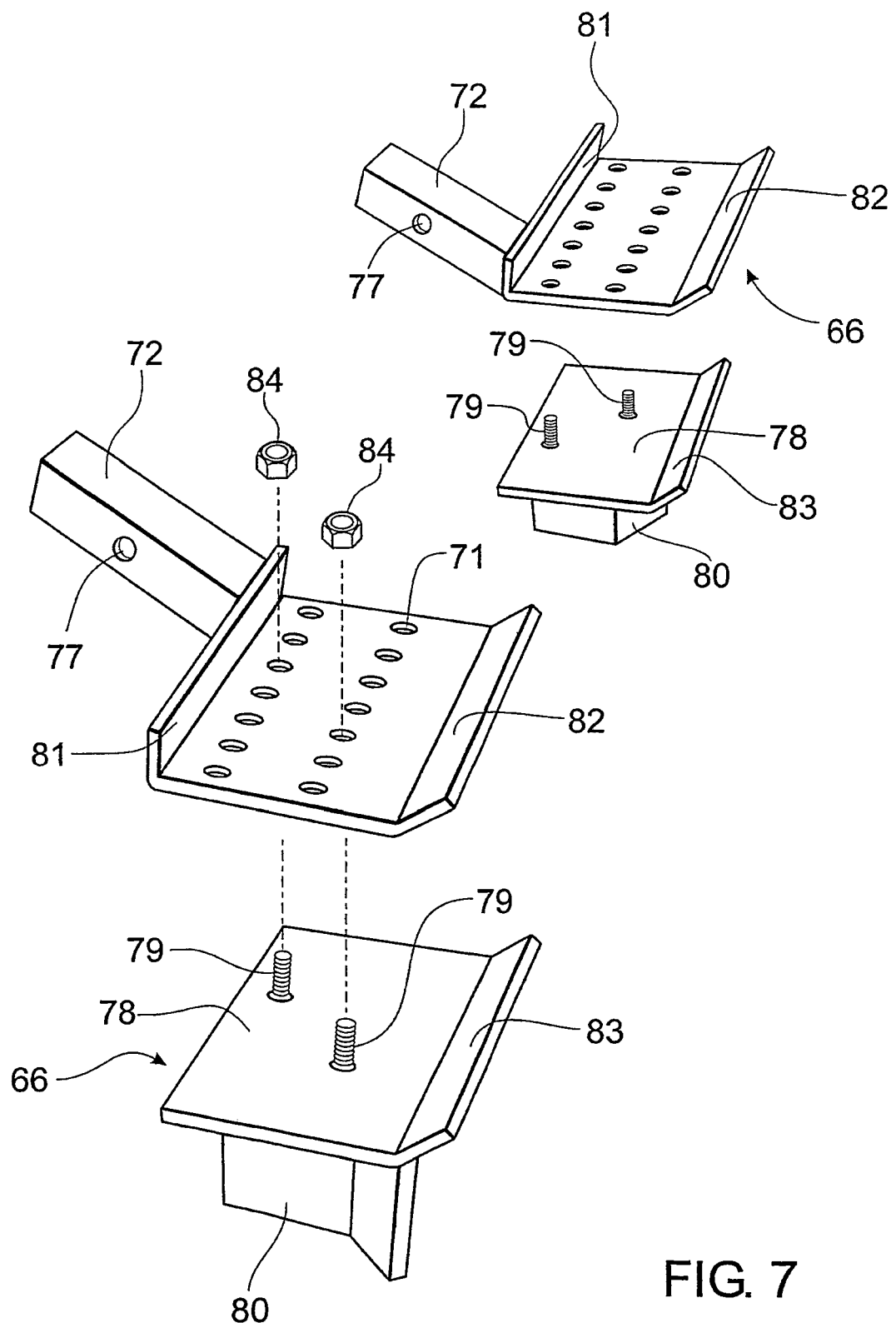
FIG. 7 shows a more detailed view of the adjustment mechanism shown in FIG. 6.

FIG. 7 shows the two adjustment mechanisms 66 located at each side of the trailer 10 for catering for different widths of axles 59A. When a desired width is obtained, fasteners 79 extend through a selected aperture 71 and are retained in place by nuts 84.

Figure 8:
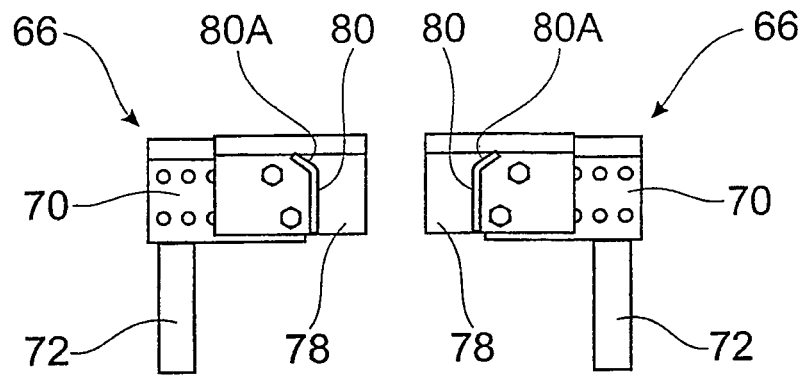
FIGS. 8, 9 and 10 show a range of different adjustment positions of the adjustment mechanism shown in FIGS. 6 and 7.
Figure 9:
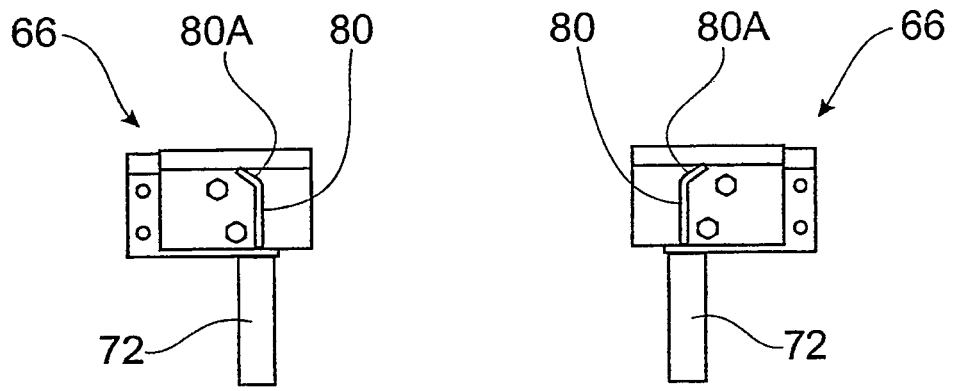
Figure 10:
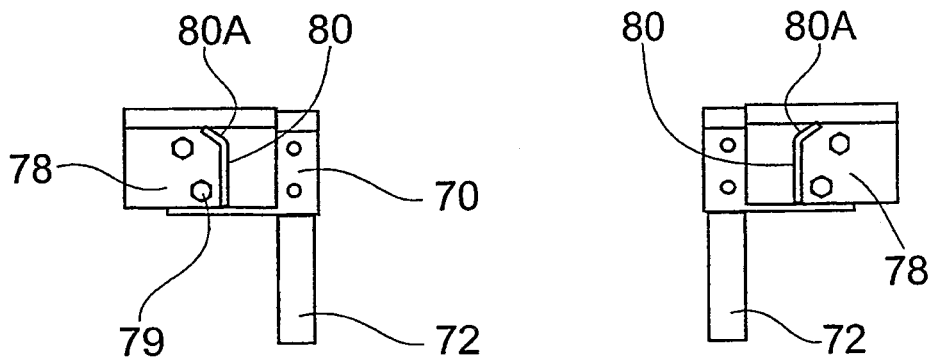

FIGS. 8, 9 and 10 show three different positions of adjustment, achieved by movement of bottom plate 78 relative to apertured plate 70. It will be appreciated that axle ends 59 first contact load in part 80A before abutting plate 80 when the mower 50 is being loaded onto trailer 10.

FIG. 11 shows a perspective view of the engagement of axle ends 59 with an adjacent adjustment mechanism 66 whereby axle end 59 of axle 59A abuts adjacent bearing plate 80 so that the lawn mower 50 is held securely between opposed abutment plates 80 for transportation. Chassis 51 is shown supported by support tray 28.

Figure 12:
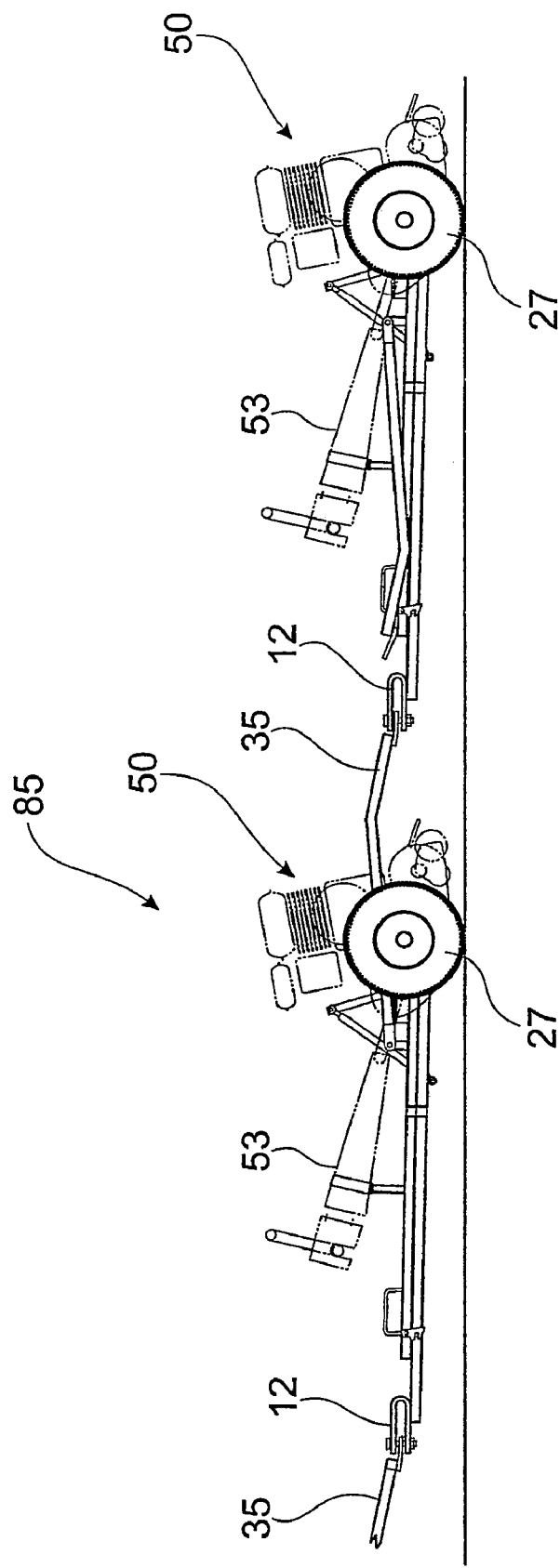
FIG. 12 shows a tandem trailer train of the invention.

FIG. 12 shows the formation of a train 85 of trailers 10, coupled together by auxiliary drawbars 35 being located in an extended position, having regard to each trailer 10 and, thus, being able to tow a second trailer 10 by connection to hitch connection 12.

It will be appreciated from the foregoing that, by the provision of pivotable auxiliary drawbar 35, the trailer 10 may be converted into a train of similar trailers 10, which are connected together as shown in FIG. 12 and, thus, provide an economical and efficient method of transportation of mowers 50 and, thus, overcomes the drawback of the prior art.

It will also be appreciated from the foregoing that trailer 10 as shown in the preferred embodiment can quickly and efficiently load mower 50 as shown in FIGS. 1-4 onto trailer 10 wherein the loading position is attained by pivotal movement of pivot frame 15 from a transportation position shown in FIG. 4 to a loading position shown in FIG. 1 so that mower 50 can be wheeled onto support tray 28 with axle ends 59 engaged by adjacent adjustment mechanisms 66. Upon attachment of handle support arm 53 to pivot frame 15 by support strap 44 shown in FIG. 3, pivot frame 15 may then be pivoted back to the transportation position shown in FIG. 4. This will cause correspondence movement of support tray 28 to lift mower 50 clear off the ground as described above. This is a considerable advance over the prior art.

It will also be readily apparent that the invention also includes within its scope the trailer incorporating the trailer frame and pivot frame as described above with the auxiliary drawbar a preferred feature.

The invention claimed is:

1. A trailer comprising:
   (i) a trailer frame supported by ground engaging wheels;
   (ii) a pivot frame that is pivotally attached to the trailer frame by pivot attachment joints;
   (iii) a separate support plate oriented transversely to the pivot frame and located at a rear end of the pivot frame, said support plate being located completely below the pivot frame and spaced apart therefrom by a pair of opposed and upstanding attachment lugs which are releasably attached to the pivot frame so that when the support plate lies on a support surface to facilitate movement or loading of maintenance apparatus or other apparatus onto the support plate said pivot frame is located completely above the support surface and is orientated at an acute angle to the support surface; and
   (iv) a width adjustment plate located at each end of the support plate, whereby in use said pivot frame pivots frame pivots from a retracted position to an operational or extended position to facilitate loading of maintenance apparatus or other apparatus of varying widths onto the support plate and subsequent lifting of the maintenance apparatus or other apparatus clear of the ground when the pivot frame is pivoted to the retracted position.

2. A trailer as claimed in claim 1 wherein each width adjustment plate has a fixed part and a moveable part which is adjustable relative to the fixed part.

3. A trailer as claimed in claim 2 wherein the width adjustment plate in use engages with outwardly extending axle ends or stub axles of the maintenance apparatus or other apparatus of varying width.

4. A trailer as claimed in claim 1 wherein the pivot frame has attachment means for attachment to the maintenance apparatus or other apparatus of varying width in the operational or extended position.

5. A trailer as claimed in claim 1 wherein each attachment lug is located at an adjacent end of the support plate and each attachment lug is releasably attached to an adjacent support bracket wherein each support bracket is also attached to an adjacent end of the pivot frame.

6. A trailer as claimed in claim 5 wherein the pivot frame is pivotally attached to an adjacent frame member of the trailer frame at pair of pivot locations adjacent to and forwardly or upstream of a proximal support bracket.

7. A trailer as claimed in claim 6 wherein them is provided a support post extending upwardly from one of said pivot locations and there is also provided a fluid actuated ram assembly interconnecting an upper end of the support post to an adjacent frame member of the trailer frame to cushion movement of the pivot frame relative to the trailer frame.

8. A trailer as claimed in claim 1 wherein them is provided cushioning means between the trailer frame and the pivot frame to cushion movement of the pivot frame relative to the trailer frame.

9. A trailer as claimed in claim 8 wherein the cushioning means is a fluid actuated ram assembly interconnecting the pivot frame and the trailer frame.

10. A trailer as claimed in claim 1 having an auxiliary drawbar pivotable from a retracted inoperative position to an extended or towing position located behind the trailer frame.

11. A trailer as claimed in claim 10 wherein the auxiliary drawbar is pivotally attached to the pivot frame by a pivot attachment joint.

12. A trailer as claimed in claim 11 wherein the auxiliary drawbar overlies the pivot frame in abutment therewith in a retracted position.

13. A trailer as claimed in claim 11 wherein the auxiliary drawbar extends outwardly from a rear end of the trailer frame in the extended or towing position.

14. A trailer as claimed in claim 10 wherein the auxiliary drawbar is provided with a hitch coupling at a free end thereof.

15. A trailer as claimed in claim 1 having connection means to a prime mover.

16. A trailer as claimed in claim 15 wherein the connection means is a main drawbar interconnecting the trailer frame and the prime mover in use.

17. A trailer as claimed in claim 1 wherein the pivot frame has a U shaped end portion.

18. A trailer as claimed in claim 1 wherein the trailer frame has a U shaped end portion.

19. A trailer as claimed in claim 1 wherein when the pivot frame is in said retracted position it overlies the trailer frame in abutment therewith and when in said extended or operational position it is pivoted upwardly relative to the trailer frame.

* * * * *

UNITED STATES PATENT AND TRADEMARK OFFICE
CERTIFICATE OF CORRECTION

PATENT NO. : 7,438,516 B2
APPLICATION NO. : 10/503850
DATED : October 21, 2008
INVENTOR(S) : Raymond J. Dufty It is certified that error appears in the above-identified patent and that said Letters Patent is hereby corrected as shown below:

Column 5, Claim 1, line 58, please delete the first two words "frame pivots" as duplicated from previous line.

Column 6, Claim 7, line 21, please correct "them", should be --there--.

Signed and Sealed this

Ninth Day of December, 2008

JON W. DUDAS
*Director of the United States Patent and Trademark Office*